(12) United States Patent
Iwasaki

(10) Patent No.: US 6,415,084 B1
(45) Date of Patent: Jul. 2, 2002

(54) COMPLEX CABLES FOR UNDER-FLOOR WIRING

(75) Inventor: Tetsuya Iwasaki, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 09/493,678

(22) Filed: Jan. 28, 2000

(30) Foreign Application Priority Data

Jan. 28, 1999 (JP) .......................................... 11-019534

(51) Int. Cl.[7] .............................. G02B 6/44; H01B 11/22
(52) U.S. Cl. ...................... 385/101; 385/102; 385/105
(58) Field of Search ................................. 385/100–115

(56) References Cited

U.S. PATENT DOCUMENTS

| | | | | |
|---|---|---|---|---|
| 5,039,195 A | * | 8/1991 | Jenkins et al. | 385/101 |
| 5,046,815 A | * | 9/1991 | Cain et al. | 385/101 |
| 5,268,971 A | * | 12/1993 | Nilsson et al. | 385/101 |
| 5,418,878 A | * | 5/1995 | Sass et al. | 385/101 |
| 5,459,804 A | * | 10/1995 | Stowe | 385/42 |
| 5,574,250 A | | 11/1996 | Hardie et al. | |
| 5,659,152 A | | 8/1997 | Horie et al. | |
| 5,668,912 A | | 9/1997 | Keller | |
| 5,687,271 A | | 11/1997 | Rabinowitz | |
| 5,699,467 A | | 12/1997 | Kojima et al. | |
| 5,940,962 A | | 8/1999 | Shima et al. | |

FOREIGN PATENT DOCUMENTS

DE 3522694 1/1987

* cited by examiner

*Primary Examiner*—Akm E. Ullah
*Assistant Examiner*—Michelle R. Connelly-Cushwa
(74) *Attorney, Agent, or Firm*—Greenblum & Bernstein, P.L.C.

(57) ABSTRACT

A complex cable for under-floor wiring can be wired in restricted spacious office floors and lowers installation costs. The complex cable includes a fiber-optic cable and a plurality of communications cables for data transmission. The fiber-optic cable includes a plurality of fiber-optic cords, a plurality of interposition members and a plastic tape assembling the cords and members all from outside. The communications cables include respectively a plurality of twin-wire strands and a plastic tape assembling the strands from outside. The fiber-optic cable is surrounded by a plurality of communications cables in parallel relation to one another over the length of the fiber-optic cable. The fiber-optic cable and the communications cables are further wrapped by a plastic tape.

17 Claims, 5 Drawing Sheets

COMPLEX CABLES FOR UNDER-FLOOR WIRING

BACKGROUND OF THE INVENTION

1. Field of the Invention

The present invention relates to a complex cable adapted for being wired under office floors, building floors or the like. The complex cable of the invention is an improved version of the data-transmission cables known in the prior art and used in under-floor wiring.

2. Description of Background Information

Recently, offices have become the main target for applying automation technologies, the so-called "office automation" technologies. In offices, the floors have to be designed so as to provide wiring spaces. The base floors of offices are often covered with panels of a given thickness and tile carpets. These panels and tile carpets are arranged side-by-side and head-to-tail, and form a "double-floor structure". The system of this construction is often called a "free access floor system".

The panel described above may be a floor panel 1 having a square shape (viewed from the top) with a given thickness, as shown in FIG. 1. This floor panel 1 may be defined by crossing channel portions 4 so as to form, for example, four unitary panel portions 2 having a substantially square shape and integrally bonded to each other via link portions 3. Each of the channel portions 4 has a substantially U-shaped cross-section and a given width, and runs between two unitary panel portions 2. The channel portions 4 can thus serve as wiring paths.

Further, the upper longitudinal side of the channel portions 4, corresponding to the upper side lines of unitary panel portions 2, are provided with steps 5. The channel portions 4 may then be covered with rectangular trench covers 6 or cross-like trench covers 7 by using the steps 5 as rests, so that the top openings of channel portions 4 can be closed.

A floor panel 1 thus formed defines a square (viewed from the top) and the flat floor surface comprises a plurality of unitary panel portions 2 and a plurality of trench covers 6 and 7. A plurality of floor panels 1 are assembled in turn side-by-side and head-to-tail, so that the channel portions 4 extend continuously in crossed directions and form extended channel portions 8. Various kinds of cables may be wired through the channel portions 8. The cables include communications cable units 9 respectively incorporating a plurality of communications cables for data transmission, fiber-optic cables 10 (FIG. 3), electric source cables or the like.

FIG. 2 shows a type of communications cable unit 9 containing a plurality of data transmission cables, e.g. twin-type data transmission cables 17. Such twin-type data transmission cables 17 are manufactured as follows. There is first provided an electrical wire 13 consisting of a conductive element 11 such as copper, and secondly an insulating coating 12 made of polyethylene (PE) or the like surrounding the conductive element 11. A pair of electrical wires 13 prepared in this way is twisted to form a twin-wire strand 14. Four pairs of twin-wire strands 14 are then wrapped with a plastic tape 15 made of polyethylene terephthalate (PET) or PE. The wrapped twin-wire strands 14 are subsequently coated with a sheath 16 made of poly (vinylchloride), i.e., PVC, or the like.

The communications cable unit 9 also comprises an interposition member 18 extending along its axial center line. The interposition member 18 is then surrounded by six groups of such twin-type data transmission cables 17 in substantially parallel relation to one another over the length of the member. Subsequently, the interposition member 18 and the twin-type data transmission cables 17 are packed with a plastic tape 19 to yield a communications cable unit 9 having an outer diameter of around 15 mm.

The communications cable units 9 described above are often used for short distance communications, e.g., on a one-conductor one-circuit basis. The system is particularly suited for the communications in a same office or building.

By comparison, FIG. 3 shows a known fiber-optic cable 10 which contains inter alia a pair of fiber-optic cords 24. To prepare a fiber-optic cord 24, optical fibers are first covered with a nylon or UV-hardened resin layer, to form a fiber-optic wire 21. The fiber-optic cord 24 comprises a fiber-optic wire 21 thus prepared, a buffer material layer 22 made of aramide fibers, surrounding the fiber-optic wire 21, and a coating made of PVC, surrounding the buffer material layer 22. In addition to the fiber-optic cords 24, the fiber-optic cable 10 contains a tension member 26 extending along its axial center line, as well as a pair of interposition members 25 made of PP yarns or PVC threads. In this construction, the tension member 26 is surrounded by the pair of fiber-optic cords 24 and the pair of interposition members 25 in substantially parallel relation to one another over the length of the member, which are then wrapped with a taping cloth 27. The outer circular surface of taping cloth 27 is further covered with a sheath 28 made of PVC or the like, to give an outer diameter of about 10 mm.

The fiber-optic cables 10 are commonly used for long distance communications, for example, on a one-fiber multiple-transmission basis. The system is particularly suitable for the communications between companies, or between head office and its branch offices. Thereafter, the communications cable units 9 and the fiber-optic cables 10 are wired independently through different process steps. This known wiring process therefore requires many process steps and increases installation costs.

Furthermore, to wire them as separate cables, a larger space is required. However, some office floors may not be able to ensure enough space for such a wiring process.

If such is the case, an optical cable 10 may be forcibly wired in a wire path having insufficient space, and the optical cable 10 thus receives a lateral stress. This lateral stress usually causes a transmission loss.

SUMMARY OF THE INVENTION

An object of the present invention is therefore to provide a complex communications cable for under-floor wiring which incorporates data transmission cables and fiber-optic cables. By virtue of this construction, offices may be easily wired, even if the office floors provide little space. This advantage may reduce installation costs.

To this end, there is provided a complex cable for under-floor wiring incorporating at least one fiber-optic cable and a plurality of communications cables for data transmission. The fiber-optic cable includes at least one fiber-optic wire and a first tightening member assembling the at least one fiber-optic wire. The plurality of communications cables for data transmission respectively include at least one twin-wire strand and a second tightening member assembling the at least one twin-wire strand. The at least one fiber-optic cable is surrounded by the plurality of communications cables for data transmission in substantially parallel relation to one another over the length of the fiber-optic cable. The fiber-optic cable and the plurality of communications cables for data transmission are then assembled by a third tightening member.

Preferably, the at least one fiber-optic cable includes at least one interposition member provided in a substantially parallel relation over the length of the at least one fiber-optic wire, and the at least one fiber-optic wire and the at least one interposition member are assembled by the first tightening member.

The above-mentioned first, second and third tightening members may respectively include a plastic tape.

Typically, the at least one fiber-optic wire includes one optical fiber as a core optical element, but it may also include a plurality of optical fibers.

Additionally, the fiber-optic cable may be provided along a central axis of the complex cable, and the plurality of communication cables may be arranged therearound. The complex cable may also be configured such that each communication cable abuts an adjacent communication cable and the fiber-optic cable to provide a closely-packed, compact cable that can be accommodated in narrow spaces.

The complex cable for under-floor wiring may be formed such that each communication cable includes a pair of twisted twin-wire strands, and the fiber-optic cable may include a pair of fiber optic cords and a pair of interposition members altenatingly arranged about a central tension member. Also, the fiber-optic cable may be provided along a central axis of the complex cable, and the plurality of communication cables may be arranged therearound. Moreover, the complex cable for under-floor wiring may be configured such that each communication cable abuts an adjacent communication cable and the fiber-optic cable to provide a closely-packed, compact cable that can be accommodated in narrow spaces.

Additionally, the complex cable for under-floor wiring may be configured with the at least one fiber-optic wire including a taped twin-axial fiber optic wire, a taped quadruple-axial fiber optic wire, or one of a taped quadruple-axial fiber optic wire covered with a buffer material layer and a taped quadruple-axial fiber optic wire covered with a buffer material layer with an outer coating.

In another aspect of the present invention, a method of making a complex cable for under-floor wiring incorporating at least one fiber-optic cable and a plurality of communications cables for data transmission is provided. The method includes providing at least one fiber-optic cable including at least one fiber-optic wire and a first tightening member, wrapping the first tightening member about the at least one fiber-optic wire, providing a plurality of communications cables for data transmission respectively including at least one twin-wire strand and a second tightening member, and wrapping the second tightening member about the at least one twin-wire strand.

The method further includes simultaneously feeding the at least one fiber-optic cable and the plurality of communication cables such that the at least one fiber-optic cable is surrounded by the plurality of communications cables for data transmission in a substantially parallel relation to one another over a length of the at least one fiber-optic cable to form an assembled strand, and wrapping a third tightening member about the assembled strand to form a closely-packed, compact cable that can be accommodated in narrow spaces.

Additionally, the method of making a complex cable may also include providing the fiber-optic cable along a central axis of the complex cable with the plurality of communication cables arranged therearound such that each communication cable abuts an adjacent communication cable and the fiber-optic cable to provide the closely-packed, compact cable that can be accommodated in narrow spaces.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 1:
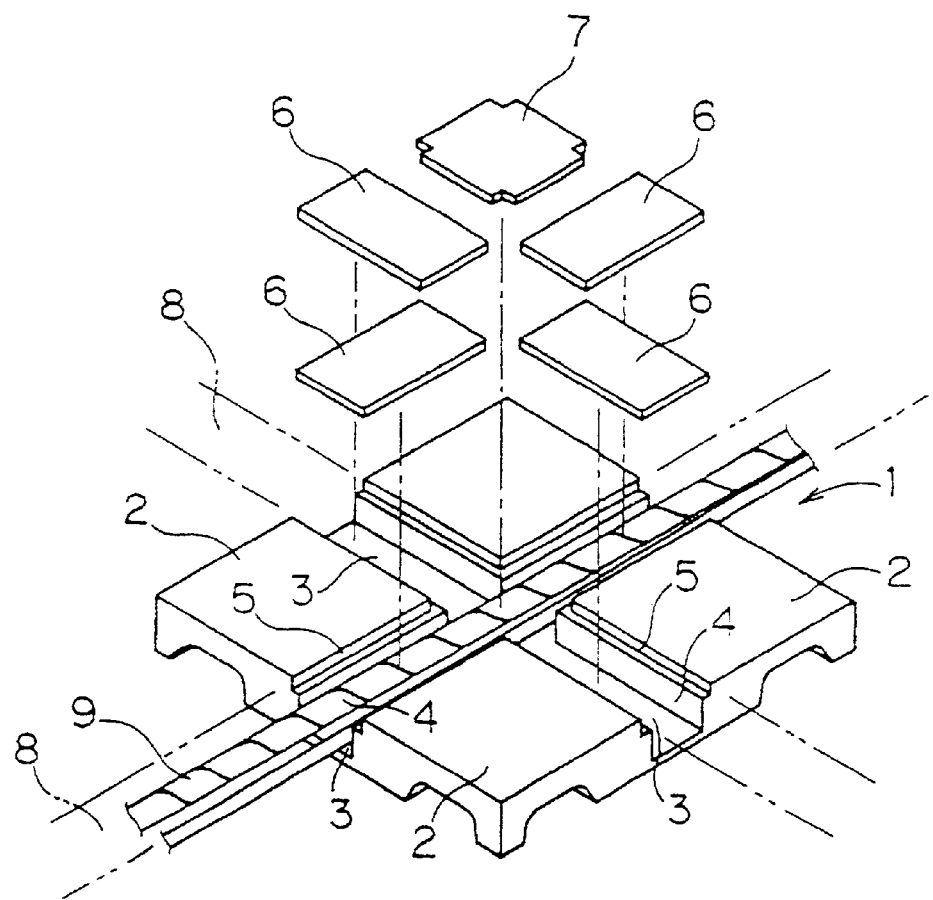
FIG. 1 is an exploded perspective view of a floor panel used in the prior art for under-floor wiring.
Figure 2:
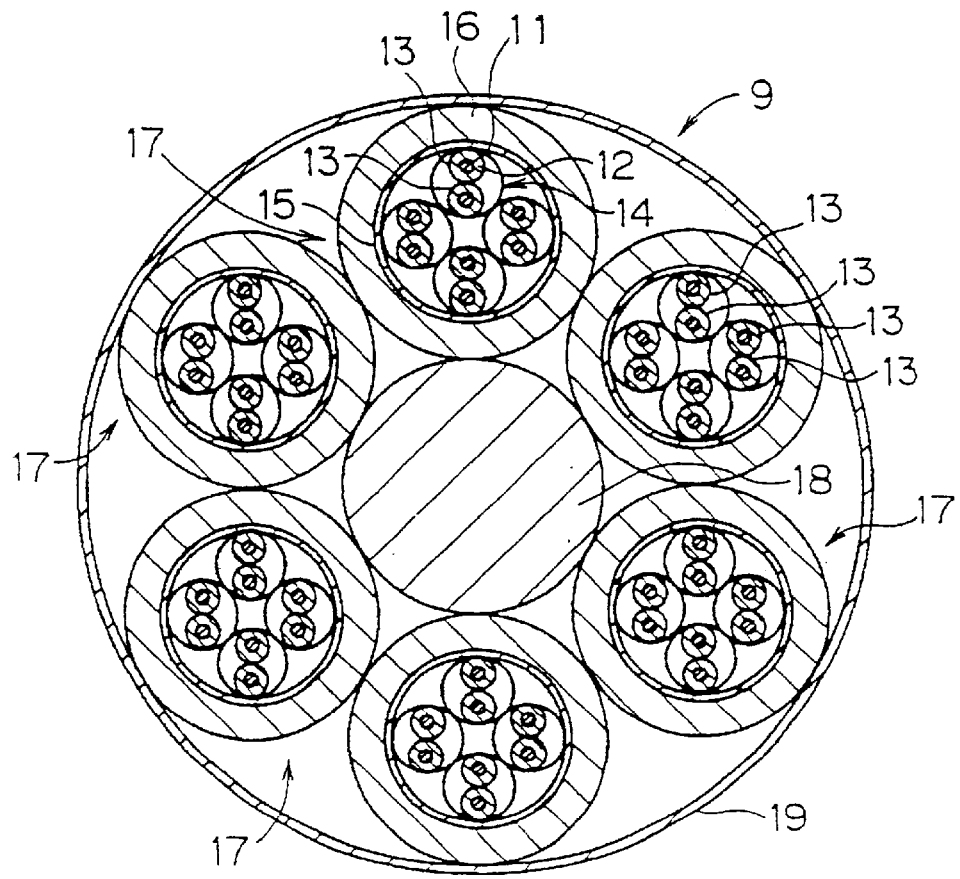
FIG. 2 is a transverse cross-sectional view of a communications cable unit known in the prior art.
Figure 3:
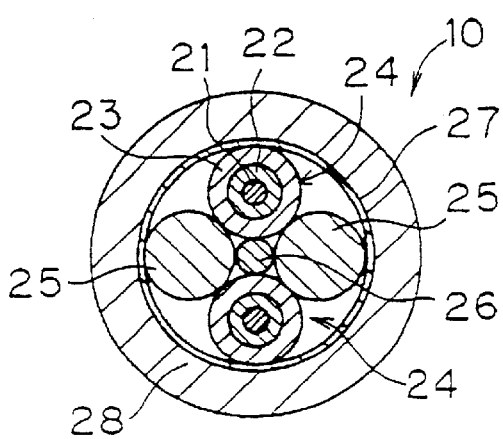
FIG. 3 is a transverse cross-sectional view of a fiber-optic cable known in the prior art.
Figure 4:
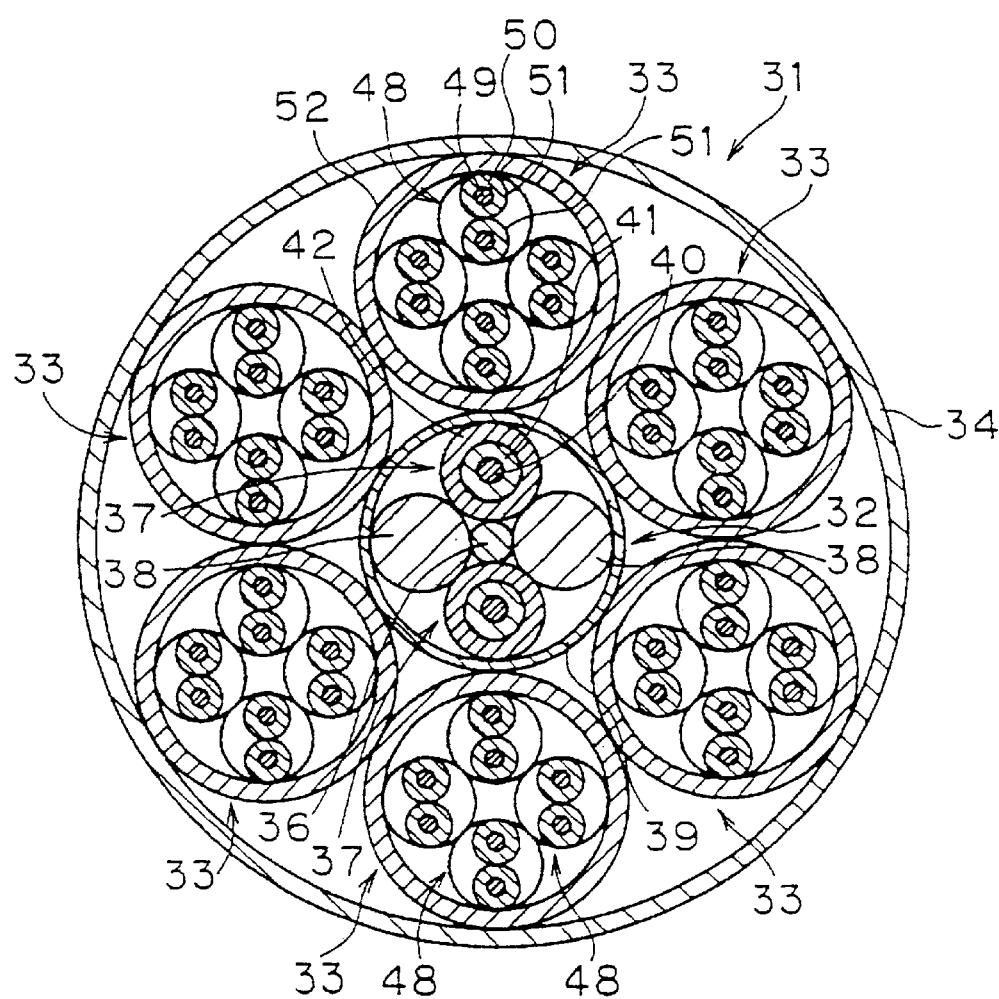
FIG. 4 is a transverse cross-sectional view of a complex cable for under-floor wiring according to an embodiment of the present invention.

FIG. 4 is a transverse cross-sectional view of a complex cable 31 for under-floor wiring according to a first embodiment of the invention. The complex cable 31 first includes a fiber-optic cable 32 along its central axial zone. The fiber-optic cable 32 is then surrounded by a plurality of communications cables for data transmission 33 (6 groups in the present embodiment) in substantially parallel relation to one another over the length of the cable 32. All the cables are then tightly wrapped with a plastic tape 34 made of PET or PE. The entirety of the fiber-optic cable 32 and communications cables for data transmission 33 forms a single unit of complex cable 31 in accordance with the invention.

As described above with reference to the prior art, the fiber-optic cable 32 includes a tension member 36 at its central axial zone. The latter is surrounded by a pair of fiber-optic cords 37 and a pair of interposition members 38, each cord 37 and each member 38 alternating, in substantially parallel relation to one another over the length of the tension member 36. All of the members and cords are then integrally wrapped with a tightening member such as a plastic tape 39. As can be seen, and by contrast with the prior art, the outermost surface of fiber-optic cable 32 of the present embodiment is constituted by a plastic tape 39 only. The use of a sheath 28 is thus obviated, by contrast with the known fiber-optic cables 10.

Figure 6:
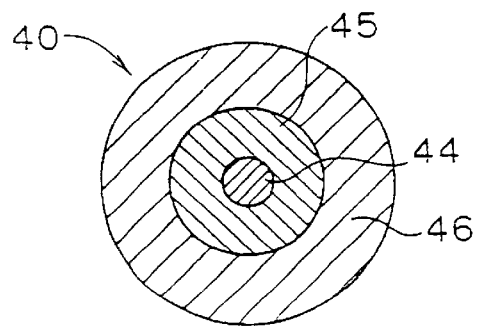
FIG. 6 is a transverse cross-sectional view of a conventional fiber-optic wire.

The fiber-optic cord 37 used in the fiber-optic cable 32 of the present invention has a known structure. In this structure, an optical fiber is first covered with a nylon layer or a UV-hardened resin layer to form a unitary wire, and this unitary wire is defined as a fiber-optic wire. FIG. 6 shows a transverse cross-section of, for example, a conventional nylon fiber-optic wire. The latter includes an optical fiber 44 made of quartz glass, a silicone resin layer 45 surrounding the optical fiber 44, and a nylon coating 46 surrounding the silicone resin layer 45. The fiber-optic cord 37 used in the invention includes a fiber-optic wire 40 such as a nylon or "UV" fiber-optic wire as an optical fiber. In addition, the fiber-optic cord 37 includes a buffer material layer 41 made of aramide fibers or the like, surrounding the fiber-optic wire 40, and a coating 42 made of PVC or PE surrounding the buffer material layer 41. The interposition members 38 used in the fiber-optic cable 32 of the invention are made of PP yarns or PVC threads, as in the prior art.

Each communications cable for data transmission 33 may include four pairs of twin-wire strands 48, as in the known configurations. Each twin-wire strand is composed by twisting a pair of electrical wires 51 respectively including a conductive element 49 such as copper, and an insulating coating 50 such as PE resin surrounding the conductive element 49. These four pairs of twin-wire strands 48 are placed together over their length and wrapped by a plastic tape 52 to form a twin-type communications cable for data transmission 33. In the communications cable 33 used in the inventive complex cable 31, the plastic tape 52 forms the outermost layer. There is therefore no need for the sheath 16 such as used in the prior art communications cables 17.

The complex cable 31 incorporating a fiber-optic cable 32 and six pairs of twin-type communications cables for data transmission 33 has an external diameter of about 15 mm.

The plastic tapes 34, 39 and 52 used in the present invention must exhibit adequate flexibility, especially in their thickness direction. This property is obtained by using a tape made of a PET or PE resin.

Figure 5:
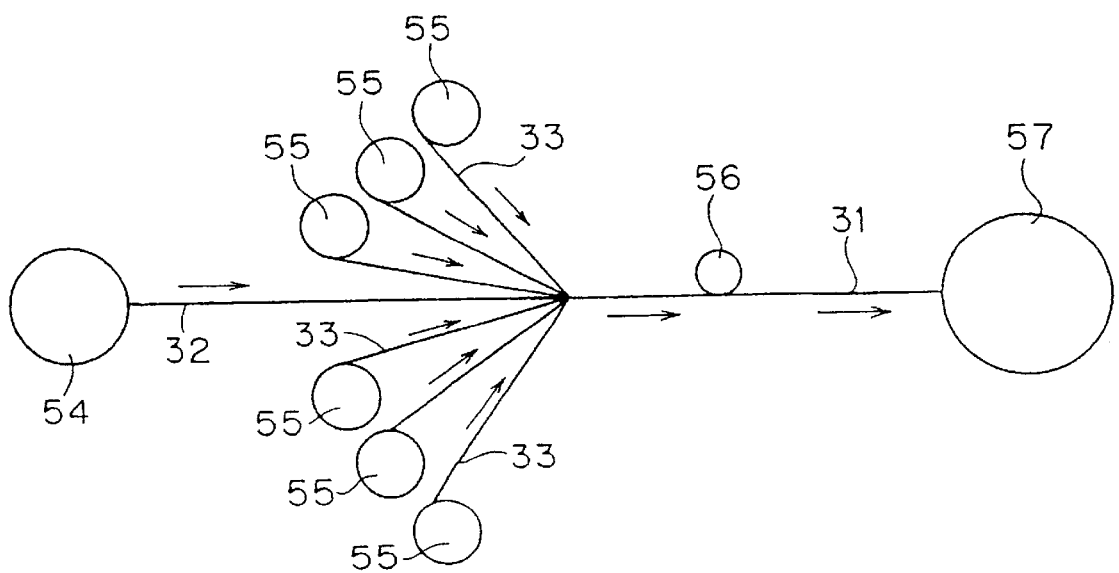
FIG. 5 schematically shows a process for the manufacture of the complex cable for under-floor wiring of FIG. 4.

As shown schematically in FIG. 5, the complex cable 31 of the invention may be manufactured, e.g. as follows. A fiber-optic cable 32 is drawn continuously from a fiber-optic cable feed drum 54, while a plurality of communications cables for data transmission 33 are also continuously drawn from corresponding communications cable feed drums 55. In this manner, the fiber-optic cable 32 and the communications cables 33 are disposed in substantially parallel relation to one another over their length. They are stranded at a given pitch and loosely wound with a plastic tape 34 continuously supplied from a tape feed mechanism 56. The complex cable 31 of the invention is thus continuously manufactured and reeled around a coiling drum 57.

According to the present invention, a fiber-optic cable 32 and a plurality of communications cables for data transmission 33 are placed together to form a single complex cable 31. By virtue of this structure, under-floor cable-transformation or conditioning processes become less costly. Consequently, the number of wiring steps is reduced, and wiring costs are lowered.

Further, there is no sheath on the fiber-optic cable 32 and the communications cables for data transmission 33 according to the invention. Accordingly, the manufacturing costs of cables are lowered. Likewise, the complex cables of the invention are lighter and their diameter is smaller. For instance, although the inventive complex cable 31 incorporates a fiber-optic cable 32 and communications cables for data transmission 33, its outer diameter can be maintained substantially as small as the known communications cable units 9. Even if only limited wiring paths are available under an office floor, both a fiber-optic cable 32 and a plurality of communications cables for data transmission 33 can be wired properly, without any difficulty. Accordingly, a greater quantity of information can be transmitted with the same wiring space as before.

As described supra, a fiber-optic cord 37 and an interposition member 38 are altenatingly arranged and wrapped with a plastic tape 39 to form a fiber-optic cable 32. Around this fiber-optic cable 32 are then arranged a plurality of communications cables 33 wrapped with a plastic tape 52. All cables are then wrapped further with a plastic tape 34. In this structure, the lateral stress exerted on the inventive complex cable 31 is buffered by surrounding communications cables for data transmission 33, and by the plastic tapes 34, 39 and 52. Therefore, each fiber-optic cord 37 is prevented from receiving direct lateral stress, and the increase of transmission loss due to such stress is efficiently avoided.

Further, there is no sheath in the complex cable structure of the present invention. Accordingly, when thermal shrinkage is formed on the plastic tapes 34, 39 and 52, the shrinking forces are exerted mainly along the radial direction of the complex cable 31, rather than along its length direction. Therefore, the formation of micro-vents in the fiber-optic wire 40 is efficiently prevented. The transmission loss can thus be further reduced.

Figure 7:
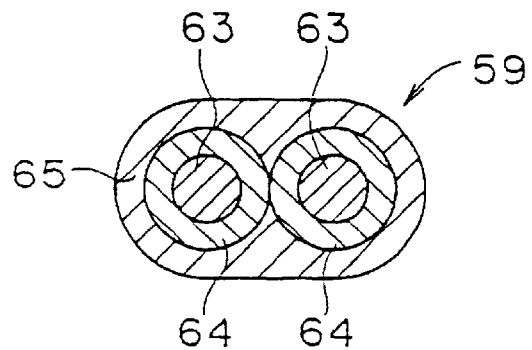
FIG. 7 is a transverse cross-sectional view of a taped, twin axial fiber-optic wire.
Figure 8:
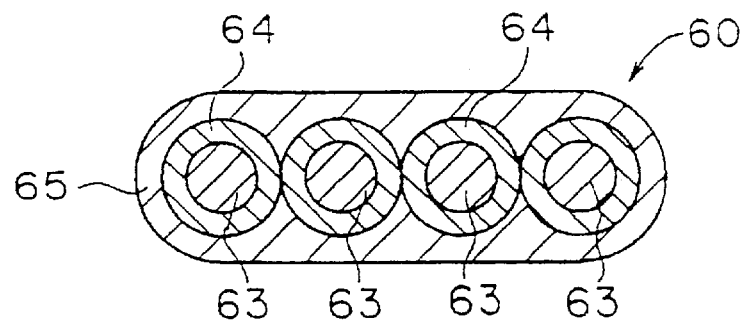
FIG. 8 is a transverse cross-sectional view of a taped, quadruple axial fiber-optic wire.
Figure 9:
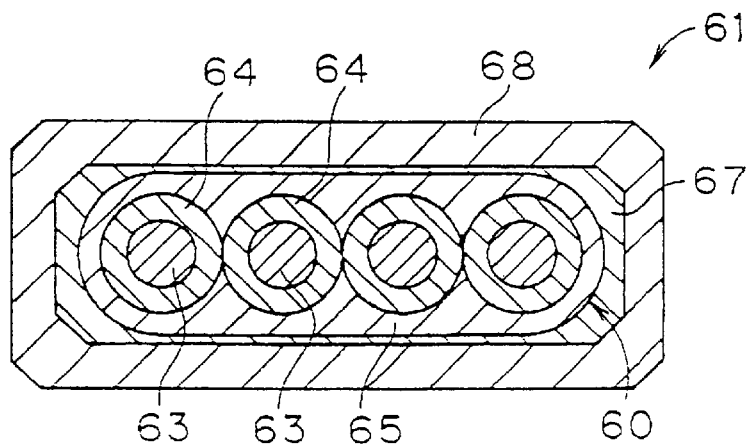
FIG. 9 is a transverse cross-sectional view of a taped cord of the taped quadruple axial fiber-optic wire of FIG. 8.

In the above embodiment, the fiber-optic cable 32 contains fiber-optic cords 37 as optical passage means. However, fiber-optic wires 40 such as shown in FIG. 6 may also be used in place of the fiber-optic cords 37. Further, a taped twin-axial fiber-optic wire 59 (FIG. 7), a taped quadruple-axial fiber-optic wire 60 (FIG. 8) or a taped cord 61 of the taped quadruple-axial fiber-optic wire (FIG. 9) may also be used.

Typically, a taped twin-axial fiber-optic wire 59 (FIG. 7) includes two optical fibers 63 made of quartz glass, a UV-hardened colored resin layer 64 surrounding each of the optical fibers, and a UV-hardened outermost resin layer 65 surrounding the UV-hardened colored resin layer 64. Likewise, the taped quadruple-axial optic wire 60 (FIG. 8) may include four optical fibers 63, a UV-hardened colored resin layer 64 surrounding each of the optical fibers 63, and a UV-hardened outermost resin layer 65 surrounding the latter.

The taped cord 61 (FIG. 9) may have a structure in which a taped quadruple-axial fiber-optic wire 60 is covered with a buffer material layer 67 made of aramide resin, and further with a coating 68 made of PVC or PE.

When such a taped multi-axial optic wire is used instead of a fiber-optic cord 37, not only the above twin- or quadruple- axial fiber-optic wire, but also any fiber-optic wire having a greater axis number may be used, insofar as the external diameter of fiber-optic cable 32 is maintained at around 6 mm. Therefore, the complex cable according to the invention allows the use of various forms of optical fibers including a multiple-axial fiber-optic wire. As a result, a greater quantity of information can be transmitted. Moreover, as various forms of optical fibers can be used, a most suitable form can be chosen arbitrarily as a function of the intended purpose.

In the above embodiment, the outermost layer of fiber-optic cable 32 is a wound plastic tape 39. In this case, the plastic tape may be wound not just in the circumferential direction of the cable 32, but may also be stretched along the length direction thereof. The plastic tapes 34, 39 and 52 used may be non-adhesive tapes, but this is not a restriction. They may also be adhesive tapes.

The inventive complex cable may use a plastic tape 39 as a tightening member. A taping cloth may also be used for the same purpose.

In the above embodiment, the fiber-optic cable 32 contains a tension member 36. It may be stretched along the length direction of the fiber-optic cable 32. The tension member 36 may also have an assembled and/or stranded structure. However, in under-floor wiring, the use of a tension member 36 is not always required.

According to the complex cable for under-floor wiring of the invention, the fiber-optic cable includes a plurality of fiber-optic cords and a tightening member assembling the fiber-optic cords, while the communications cables for data transmission respectively include a plurality of twin-wire strands and a plastic tape assembling the twin-wire strands. The fiber-optic cable is then surrounded by the plurality of communications cables for data transmission in substantially parallel relation to one another over the length of the fiber-optic cable. Subsequently, the fiber-optic cable and the plurality of communications cables for data transmission are assembled by a plastic tape. The fiber-optic cable and the plurality of communications cables for data transmission are thus placed together and form a single complex cable. As a result, when carrying out under-floor wiring, the cable transformation cost is reduced, and the wiring process steps are simplified. As a consequence, the overall wiring cost is lowered.

Moreover, the fiber-optic cable and the communications cables do not contain a sheath as used in the past. Consequently, their manufacturing cost is reduced, and their weight is lessened. In addition, their external diameter becomes smaller. As a result, although the fiber-optic cable and the communications cables are assembled together, the outer diameter of a complex cable so assembled can be maintained reasonably small. Accordingly, even in an office floor lacking the space for wiring paths, a fiber-optic cable and a plurality of communications cables can be installed simultaneously and easily. Consequently, a greater volume of data can be transmitted with the same wiring space as before.

As mentioned supra, the sheath layers are omitted from the fiber-optic cable and the communications cables. Accordingly, when a thermal shrinkage is generated, the plastic tape shrinks mainly in the radial direction of the complex cable, rather than in its length direction. As a result, the formation of micro-vents in the optical fibers is efficiently prevented, and the transmission loss ceases to increase.

Further, the tightening members are formed of a plastic tape, and the fiber-optic cable includes at least one interposition member provided in substantially parallel relation to the optical fibers. The optical fibers and the at least one interposition member can thus be easily packed by the plastic tape. In this structure, the lateral stress exerted on the complex cable is buffered by the surrounding communications cables and plastic tapes, so that each optical fiber receives less lateral pressure directly. The transmission loss is thus prevented from increasing.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. HEI 11-019534, filed on Jan. 28, 1999, which is herein expressly incorporated by reference in its entirety.

What is claimed is:

1. A complex cable for under-floor wiring incorporating at least one fiber-optic cable and a plurality of communications cables for data transmission, said at least one fiber-optic cable comprising at least one fiber-optic wire and a first tightening member assembling said at least one fiber-optic wire, said plurality of communications cables for data transmission respectively comprising at least one twin-wire strand and a second tightening member assembling said at least one twin-wire strand, said at least one fiber-optic cable being surrounded by said plurality of communications cables for data transmission in a substantially parallel relation to one another over the length of said at least one fiber-optic cable, said at least one fiber-optic cable and said plurality of communications cables for data transmission being assembled by a third tightening member, wherein said fiber-optic cable is provided along a central axis of said complex cable, said plurality of communication cables being arranged therearound, and wherein said complex cable is configured such that each communication cable abuts an adjacent communication cable and said fiber-optic cable to provide a closely-packed, compact cable that can be accommodated in narrow spaces.

2. The complex cable for under-floor wiring according to claim 1, wherein said at least one fiber-optic cable includes at least one interposition member provided in a substantially parallel relation to one another over the length of said at least one fiber-optic wire, and said at least one fiber-optic wire and said at least one interposition member are assembled by said first tightening member.

3. The complex cable for under-floor wiring according to claim 2, wherein said first, second and third tightening members respectively comprise a plastic tape.

4. The complex cable for under-floor wiring according to claim 3, wherein said at least one fiber-optic wire comprises at least one optical fiber.

5. The complex cable for under-floor wiring according to claim 2, wherein said at least one fiber-optic wire comprises at least one optical fiber.

6. The complex cable for under-floor wiring according to claim 1, wherein said first, second and third tightening members respectively comprise a plastic tape.

7. The complex cable for under-floor wiring according to claim 6, wherein said at least one fiber-optic wire comprises at least one optical fiber.

8. The complex cable for under-floor wiring according to claim 1, wherein said at least one fiber-optic wire comprises at least one optical fiber.

9. The complex cable for under-floor wiring according to claim 1, wherein each communication cable comprises a pair of twisted twin-wire strands.

10. The complex cable for under-floor wiring according to claim 1, wherein said fiber-optic cable comprises a pair of fiber optic cords and a pair of interposition members alternatingly arranged about a central tension member.

11. The complex cable for under-floor wiring according to claim 10, wherein each of said plurality of communication cables comprises a pair of twisted twin-wire strands.

12. The complex cable for under-floor wiring according to claim 11, wherein said fiber-optic cable is provided along a central axis of said complex cable, and said plurality of communication cables is arranged therearound.

13. The complex cable for under-floor wiring according to claim 12, wherein said complex cable is configured such that each communication cable abuts an adjacent communication cable and said fiber-optic cable to provide a closely-packed, compact cable that can be accommodated in narrow spaces.

14. The complex cable for under-floor wiring according to claim 1, wherein said at least one fiber-optic wire comprises a taped twin-axial fiber optic wire.

15. The complex cable for under-floor wiring according to claim 1, wherein said at least one fiber-optic wire comprises a taped quadruple-axial fiber optic wire.

16. The complex cable for under-floor wiring according to claim 1, wherein said at least one fiber-optic wire comprises one of a taped quadruple-axial fiber optic wire covered with a buffer material layer and a taped quadruple-axial fiber optic wire covered with a buffer material layer with an outer coating.

17. A method of making a complex cable for under-floor wiring incorporating at least one fiber-optic cable and a plurality of communications cables for data transmission, comprising:

provinding at least one fiber-optic cable comprising at least one fiber-optic wire and a first tightening member;

wrapping said first tightening member about said at least one fiber-optic wire;

providing a plurality of communications cables for data transmission respectively comprising at least one twin-wire strand and a second tightening member;

wrapping said second tightening member about said at least one twin-wire strand;

simultaneously feeding said at least one fiber-optic cable and said plurality of communication cables such that said at least one fiber-optic cable is surrounded by said plurality of communications cables for data transmission in a substantially parallel relation to one another over a length of said at least one fiber-optic cable to form an assembled strand;

wrapping a third tightening member about said assembled strand to form a closely-packed, compact cable that can be accommodated in narrow spaces; and further comprising providing said fiber-optic cable along a central axis of said complex cable with said plurality of communication cables arranged therearound such that each communication cable abuts an adjacent communication cable and said fiber-optic cable to provide the closely-packed, compact cable that can be accommodated in narrow spaces.

* * * * *